United States Patent
Hebert

(10) Patent No.: US 12,134,238 B2
(45) Date of Patent: Nov. 5, 2024

(54) FIBER-REINFORCED COMPOSITE LAYUP

(71) Applicant: 3M INNOVATIVE PROPERTIES COMPANY, St. Paul, MN (US)

(72) Inventor: Larry S. Hebert, Hudson, WI (US)

(73) Assignee: 3M Innovative Properties Company, St. Paul, MN (US)

(*) Notice: Subject to any disclaimer, the term of this patent is extended or adjusted under 35 U.S.C. 154(b) by 538 days.

(21) Appl. No.: 17/414,248

(22) PCT Filed: Dec. 16, 2019

(86) PCT No.: PCT/IB2019/060860
§ 371 (c)(1),
(2) Date: Jun. 15, 2021

(87) PCT Pub. No.: WO2020/128793
PCT Pub. Date: Jun. 25, 2020

(65) Prior Publication Data
US 2022/0055324 A1  Feb. 24, 2022

Related U.S. Application Data

(60) Provisional application No. 62/784,043, filed on Dec. 21, 2018.

(51) Int. Cl.
*B29C 70/88* (2006.01)
*B29C 70/38* (2006.01)
(Continued)

(52) U.S. Cl.
CPC .......... *B29C 70/885* (2013.01); *B29C 70/382* (2013.01); *B32B 15/14* (2013.01);
(Continued)

(58) Field of Classification Search
CPC ..... B29C 70/885; B29C 70/382; B32B 15/14; B32B 2260/023; B32B 2260/046;
(Continued)

(56) References Cited

U.S. PATENT DOCUMENTS

| 4,078,107 | A | 3/1978 | Bitterice |
| 4,804,806 | A | 2/1989 | Orr, Jr. |

(Continued)

FOREIGN PATENT DOCUMENTS

| CN | 105479830 A | 4/2016 |
| CN | 108367526 A | 8/2018 |

(Continued)

OTHER PUBLICATIONS

International Search report for PCT International Application No. PCT/IB2019/060860 mailed on Apr. 1, 2020, 6 pages.

*Primary Examiner* — Laura C Powers
(74) *Attorney, Agent, or Firm* — Carlos M. Téllez Rodríguez; 3M Innovative Properties Company

(57) ABSTRACT

Fiber-reinforced composites is provided. The composites include a plurality of prepreg layers, each comprising a polymeric resin and a plurality of fibers disposed therein; and at least one electrically-conductive layer at least partially embedded in the plurality of prepreg layers. These fiber-reinforced composites can save weight relative to externally provided wires and can be provided in forms suitable for use in automated fiber placement and automated tape layup machines. Advantageous applications include uses in lightning strike protection, energy storage, signal transmission, and power distribution.

11 Claims, 6 Drawing Sheets

(51) Int. Cl.
*B32B 15/14* (2006.01)
*B29K 105/08* (2006.01)
*B29L 31/30* (2006.01)
*B64D 45/02* (2006.01)

(52) U.S. Cl.
CPC .............. *B29K 2105/0872* (2013.01); *B29K 2995/0005* (2013.01); *B29L 2031/3076* (2013.01); *B32B 2260/023* (2013.01); *B32B 2260/046* (2013.01); *B32B 2307/202* (2013.01); *B32B 2605/18* (2013.01); *B64D 45/02* (2013.01)

(58) Field of Classification Search
CPC .......... B32B 2307/702; B32B 2605/18; B29K 2105/0872; B29K 2995/0005; B29L 2031/3076; B64D 45/02
See application file for complete search history.

(56) References Cited

U.S. PATENT DOCUMENTS

| | | |
|---|---|---|
| 2011/0088923 A1 | 4/2011 | Cawse |
| 2012/0063050 A1 | 3/2012 | Langone |
| 2018/0208729 A1 | 7/2018 | Kurokawa |

FOREIGN PATENT DOCUMENTS

| | | |
|---|---|---|
| WO | 2008/056123 A1 | 5/2008 |
| WO | WO2014-152911 | 9/2014 |
| WO | 2017/095810 A1 | 6/2017 |
| WO | WO2017-091365 | 6/2017 |
| WO | WO2018-063970 | 4/2018 |

FIBER-REINFORCED COMPOSITE LAYUP

CROSS REFERENCE TO RELATED APPLICATIONS

This application is a national stage filing under 35 U.S.C. 371 of PCT/IB2019/060860, filed Dec. 16, 2019, which claims the benefit of U.S. Provisional Application No. 62/784,043, filed Dec. 21, 2018, the disclosure of which is incorporated by reference in its/their entirety herein.

FIELD OF THE INVENTION

Provided are layered fiber-reinforced composite articles and assemblies, along with methods of manufacture and use thereof. Such articles and assemblies may be incorporated into primary aircraft structures.

BACKGROUND

Modern vehicles are becoming more electrified than ever before. Electrification has made it possible to improve performance while reducing greenhouse gas emissions and noise. The emergence of electric cars has illuminated the many possibilities and benefits associated with powering vehicles using electricity. Moreover, like its counterparts in the automotive field, aircraft are also becoming increasingly electrified as systems and monitoring functions have become more sophisticated.

These benefits are accompanied by their own unique technical challenges. Electrical wires are heavy. Each wire must be insulated from the surrounding environment for electrical isolation, corrosion protection, and personnel safety. Each wire must be strong enough to support its own weight in the impact and vibratory environment of an aircraft. Wires may need to be supported at relatively short intervals along its length to avoid abrasion and other destructive factors. Depending on the application, wires may need to be carefully positioned relative to other wires and various electric field sources to avoid electromagnetic interference and coupling.

SUMMARY

Provided herein are fiber-reinforced composites that embed conductors within the plies of a fiber reinforced plastic composite and function as a conductor of an electrical current to carry signals or distribute power. They can be used to form conductive pathways within the layered material. The pathways could be within a layer (oriented with a layer), on a layer (orientation independent of the layer), through a layer (to function as a via on a circuit board), or with insulating layers within or on the fiber reinforced plastic composite.

Embedding the conductive traces within a fiber-reinforced plastic composite allows the conductor to be fully supported by the composite, require minimal to no additional insulation, require no clamps or brackets for support, and reduces incidental contact with fluids and abrasion. Embedded conductors can also benefit from the natural electromagnetic shielding properties of the surrounding composite and can be easily separated and routed relative to each other for optimum performance.

As another factor, large fiber reinforced plastic composite parts in the aerospace industry are fabricated using automated means, as opposed to manual layups, to reduce manufacturing costs, improve quality, and increase production rates. Advantageously, the provided solution embeds conductors in a fiber-reinforced composite in a configuration that is compatible with automated manufacturing methods.

The potential applications are significant and diverse. The provided conductor layups can be used to incorporate optical or electrical transmission features, enable composite materials to include energy storage features such as capacitors and/or batteries, incorporate energy harvesting features onto the network, and replace insulating or secondarily conductive elements in the ribbon with semi-conductive voltage-variable resistive constructs to function as a natural overload shunt.

In a first aspect, a fiber-reinforced composite is provided. The composite comprises: a plurality of prepreg layers, each comprising a polymeric resin and a plurality of fibers disposed therein; and at least one electrically-conductive layer in contact with the plurality of prepreg layers, the at least one electrically-conductive layer having a ribbon shape.

In a second aspect, an automotive or aircraft part such as an aircraft skin, aircraft fuselage panel, or capacitor is provided that comprises the composite.

In a third aspect, a method for providing an electrical conductor in a fiber-reinforced composite is provided, comprising: moving an automated fiber placement head over a substrate; using the fiber placement head to lay down a prepreg layer extending over the substrate, the prepreg layer comprising a polymeric resin and a plurality of fibers disposed therein; and using the fiber placement head to lay down an electrically-conductive layer extending over the substrate, wherein the electrically-conductive layer contacts either the substrate or the prepreg layer and the prepreg layer contacts either the substrate or the electrically-conductive layer.

Figure 1:
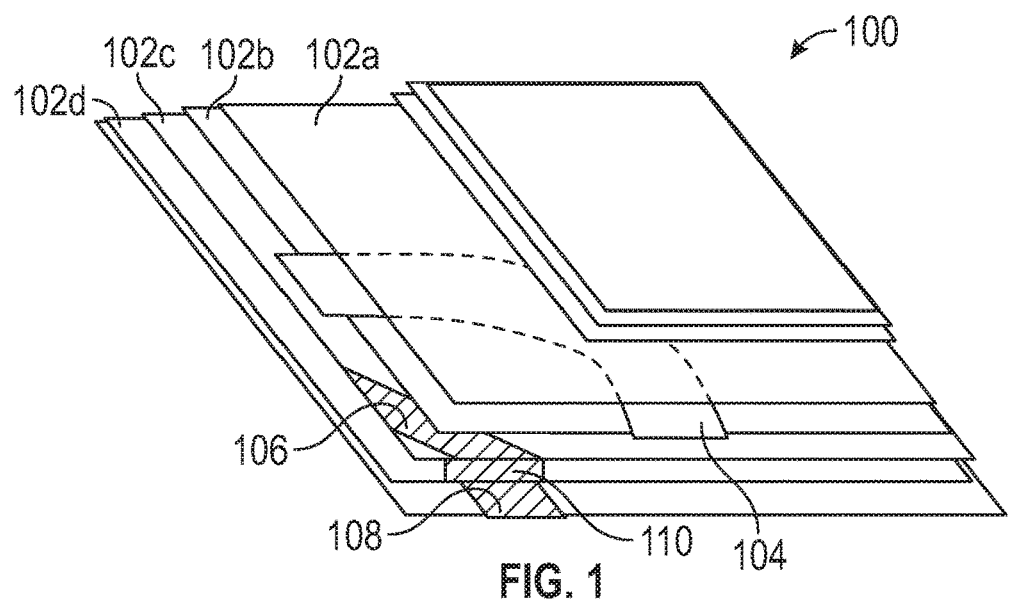
FIG. 1 is a fragmentary, perspective view of a composite laminate according to one exemplary embodiment, showing its top, front, and side surfaces.

Repeated use of reference characters in the specification and drawings is intended to represent the same or analogous features or elements of the disclosure. It should be understood that numerous other modifications and embodiments can be devised by those skilled in the art, which fall within the scope and spirit of the principles of the disclosure. The figures may not be drawn to scale.

DEFINITIONS

"Ambient conditions" means at 25° C. and 101.3 kPa pressure.

"Average" means number average, unless otherwise specified.

"Continuous" means extending across a single, unified area along a given layer (a perforated sheet can be continuous);

"Cure" refers to exposing to radiation in any form, heating, or allowing to undergo a physical or chemical reaction that results in hardening or an increase in viscosity.

"Discontinuous" means extending across a plurality of discrete areas along a given layer, where the discrete areas are spaced apart from each other;

"Polymer" refers to a molecule having at least one repeating unit and can include copolymers.

"Ribbon" means a construction that is generally constant in width and thickness and available in lengths considerably larger than its width, wherein each length can be conveniently dispensed and/or cut to a desired dimension.

"Size" refers to the longest dimension of a given object or surface.

"Substantially" means to a significant degree, as in an amount of at least 50%, 60, 70, 80, 90, 95, 96, 97, 98, 99, 99.5, 99.9, 99.99, or 99.999%, or 100%.

"Thickness" means the distance between opposing sides of a layer or multilayered article.

DETAILED DESCRIPTION

As used herein, the terms "preferred" and "preferably" refer to embodiments described herein that can afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the invention.

As used herein and in the appended claims, the singular forms "a," "an," and "the" include plural referents unless the context clearly dictates otherwise. Thus, for example, reference to "a" or "the" component may include one or more of the components and equivalents thereof known to those skilled in the art. Further, the term "and/or" means one or all the listed elements or a combination of any two or more of the listed elements.

It is noted that the term "comprises" and variations thereof do not have a limiting meaning where these terms appear in the accompanying description. Moreover, "a," "an," "the," "at least one," and "one or more" are used interchangeably herein. Relative terms such as left, right, forward, rearward, top, bottom, side, upper, lower, horizontal, vertical, and the like may be used herein and, if so, are from the perspective observed in the drawing. These terms are used only to simplify the description, however, and not to limit the scope of the invention in any way.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Where applicable, trade designations are set out in all uppercase letters.

The present disclosure is directed to the cured and uncured forms of fiber-reinforced composite articles. The composite articles include a plurality of layers, and more particularly a plurality of prepreg layers.

A prepreg layer refers to a reinforcing fabric which has been pre-impregnated with a resin system. Commonly the resin system is an epoxy or other thermoset resin and comes pre-mixed with a suitable curing agent. In a manufacturing process, multiple layers of prepreg can be laid down by hand or automated methods onto a shaped mold or tool, and then cured by a combination of pressure and heat.

Prepregs offer several technical advantages, such as the ability to provide high-strength parts, uniformity and repeatability in manufacture, reduced waste, and relatively short curing times. Applications for prepregs include aerospace components, racing, sporting goods, pressure vessels, and commercial products.

A fiber-reinforced composite according to one exemplary embodiment is shown in FIG. 1 and hereinafter referred to by the numeral 100. The composite 100, as shown, has a layered structure with two major surfaces. Amongst these layers are prepreg layers 102a, 102b, 102c, as shown.

Each of prepreg layers 102a, 102b, 102c includes a polymeric resin and a plurality of fibers dispersed in the polymeric resin. The plurality of fibers can be provided in the form of a weave that acts as a reinforcing fabric. Non-woven fibers are also possible, in which fiber entanglements enhance web strength along the plane of the layer. Many fibers are available for these purposes, including but not limited to glass fibers, basalt fibers, carbon fibers, and aramid fibers.

If desired, the fibers may be preferentially oriented along certain directions. This can be useful in instances where a given prepreg layer is being laid down in a series of parallel bands (or ribbons) using an automated fiber placement machine. In these cases, it can be preferred for the fibers to be preferentially oriented along the length of the ribbon.

The polymeric resin acts as a matrix and may be made from a thermoset or a thermoplastic resin. Common thermoset resins are epoxy resins, but vinyl ester-based resins, phenolics, bismaleimide, or cyanate ester can also be used. Curatives for these resins are known in the art and can be incorporated into the polymeric resin.

Useful thermoplastic resins include polyurethane, polyvinylidene fluoride, terpolymer of tetrafluoroethylene, hexafluoropropylene and vinylidene fluoride (THV), terpolymer of hexafluoropropylene, tetrafluoroethylene and ethylene (HTE), polyetherimide, polyetherether-ketone (PEEK), polyetherketoneketone (PEKK), and combinations thereof.

The prepreg layers 102a, 102b, 102c in this embodiment, are electrically-insulating layers. These layers have insulating properties if both the matrix and fibers therein are not electrically-conductive. Insulating properties, at least along certain directions, can also result if any conductive fibers (e.g., carbon fibers) are spatially separated, thus preventing electrical connectivity across the layer. Optionally, one or more of the prepreg layers 102a, 102b, 102c can contain one or more sheets of glass and/or nylon disposed in the polymeric resin along with the plurality of fibers.

The average thickness of the prepreg layers 102a, 102b, 102c can vary significantly based on the application and manufacturing method, but is generally in the range of from 4 micrometers to 3000 micrometers, from 8 micrometers to 3000 micrometers, from 12 micrometers to 400 micrometers, or in some embodiments, 4 micrometers, 6, 8, 10, 15, 20, 25, 30, 35, 40, 45, 50, 60, 70, 80, 90, 100, 150, 200, 250, 300, 350, 400, 450, 500, 600, 700, 800, 900, 1000, 1500, 2000, 2500, or 3000 micrometers.

The composite 100 further includes a first electrically-conductive layer 104 disposed between the prepreg layers 102a, 102b. By supporting an electric current, the electrically-conductive layer 104 is capable of use in widespread applications, including electrical circuits for sensors and actuators and lightning strike protection materials. A pair of electrically-conductive layers separated by an insulating prepreg layer can, for example, act as a parallel plate capacitor.

The first electrically-conductive layer 104 can be a continuous or discontinuous layer, and may be strongly or weakly conductive. Its conductivity may be anisotropic (varying by direction). Electrical currents conveyed may be of constant polarity and magnitude, or have variable frequency, variable amplitude, and/or variable polarity.

In this construction, the electrically-conductive layer 104 has the shape of a ribbon and traverses certain portions of the adjacent prepreg layers 102a, 102b but not others, as viewed from a direction perpendicular to a major surface of the composite. As a result, the electrically-conductive layer 104 can be embedded between the prepreg layers 102a, 102b, a construction in which the prepreg layers 102a, 102b collectively function as an insulator around the first electrically-conductive layer 104.

The electrically-conductive layer 104 can be made from any of a number of conductive materials. Suitable conductive materials may be monolithic in nature. Monolithic materials include metal layers of, for example, copper, aluminum, titanium, silver, gold, tin, nickel or their alloys. Metal conductors may be obtained from continuous metal foils. Metal foils may be unperforated or perforated to provide weight savings.

Perforated metal foils, also referred to as foraminous foils, may be made by any known method, including expanding, perforating, cutting, drilling, or plating. Expanded metal foils, for example, are made by slitting a metal foil and then stretching transversely or longitudinally to create a staggered, two-dimensional array of perforations. Foraminous foils need not be characterized by a regularly repeating pattern of holes.

Useful metal layers can an areal density of from 0.02 gsm to 1000 gsm, 4 gsm to 500 gsm, 4 gsm to 350 gsm, or in some embodiments, less than, equal to, or greater than 0.02 gsm, 0.05, 0.1, 0.2, 0.5, 0.7, 1, 2, 5, 7, 10, 15, 20, 25, 30, 35, 40, 45, 50, 60, 70, 80, 90, 100, 150, 200, 250, 300, 350, 400, 450, 500, 600, 700, 800, 900, or 1000 gsm.

Alternatively, the electrically-conductive layer 104 can be made by dispersing electrically-conductive particles in a matrix resin. Conductive particles can be in the form of spheres, chopped fibers, or flakes. The matrix resin, which is generally not electrically-conductive, can be composed of any of the polymeric resins described previously for the prepreg layers 102a, 102b, 102c.

The conductive particles or sheets are not particularly limited and can be comprised of electrically-conductive particles or sheets of carbon, glass and/or nylon. Suitable sheets include papers or weaves of electrically-conductive fibers. Carbon fiber is, by itself, weakly conductive. Non-conductive particles and sheets can be made conductive by coating with an electrically-conductive metal-usually silver, gold, tin, copper, nickel or alloys thereof. Examples of these include metallized glass or metallized nylon. If desired, conductive fibers and particles can both be incorporated into the same layer within the ribbon.

The matrix resin is preferably loaded with conductive particles or sheets at sufficient amounts to impart substantial electrical conductivity along the length of the ribbon. The loading of the conductive particles or sheets in the matrix resin can be from 3% to 50%, from 3% to 35%, from 5% to 15%, or in some embodiments, less than, equal to, or greater than 3%, 5, 7, 10, 15, 20, 25, 30, 35, 40, 45, or 50% by weight relative to the overall weight of the electrically-conductive layer 104.

As a further option, the electrically-conductive layer 104 could have a hybrid construction in which a monolithic conductor such as a perforated or unperforated metal foil is used in combination with a matrix resin containing electrically-conductive particles or sheets.

The ribbon can be made flat and quite thin to preserve flexibility of the layer, while retaining its capacity to carry an electrical current with much less current loss or much less loss of signal clarity than is capable by the surrounding fiber-reinforced composite. Depending on the particulars of the application and other dimensions of the ribbon, the average thickness of the ribbon can be from 8 micrometers to 3000 micrometers, from 12 micrometers to 900 micrometers, from 50 micrometers to 400 micrometers, or in some embodiments, 8 micrometers, 10, 12, 15, 17, 20, 22, 25, 27, 30, 35, 40, 45, 50, 60, 70, 80, 90, 100, 150, 200, 300, 350, 400, 45, 500, 600, 700, 800, 900, 1000, 1500, 2000, 2500, or 3000 micrometers.

Referring again to FIG. 1, the composite 100 further includes second and third conductive layers 106, 108, which have similar characteristics to the conductive layer 104. The conductive layers 106, 108 are separated by a prepreg layer 102d but are connected along one area by an electrically-conductive via 110. Unlike the conductive layer 104, the conductive layer 106 and via 110 are coplanar with a prepreg layer—for example, the conductive layer 106 is coplanar with the prepreg layer 102c and the via 110 is coplanar with the prepreg layer 102d. The second conductive layer 106 and via 110 also have peripheral edges that contact respective peripheral edges of the prepreg layers 102c, 102d.

The electrically-conductive via 110 is a discontinuous, electrically-conductive layer that provides an electrically-conductive pathway along the z-axis of the composite 100—i.e., the direction perpendicular to its major surface. Advantageously, the via 110 provides a confined, pre-determined area where electrical conductivity is available through an opening (e.g., window) in the prepreg layer 102d. Potentially, this opening can enable communication between opposing sides of the prepreg layer 102d not only with respect to electrical conduction but also thermal conduction, electric permittivity, and magnetic permeability. Openings in a prepreg layer can allow electrically-conductive layers on opposite sides of the prepreg layer to contact each other through the opening.

Figure 2:
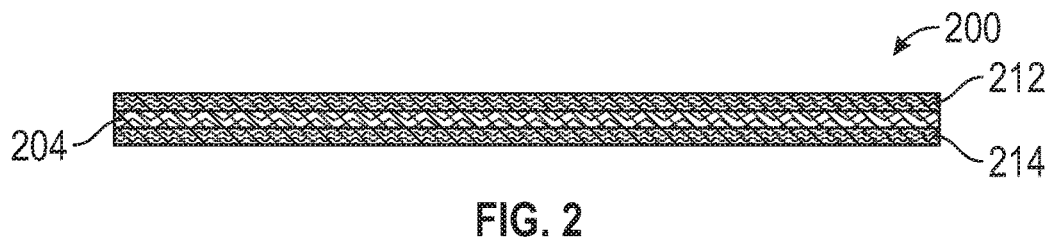
FIG. 2 is a side, cross-sectional view of a composite ribbon in an exemplary embodiment.

FIG. 2 shows a composite ribbon 200 in which an electrically-conductive layer 204 is provided in a sandwich construction between two adjacent layers. In this three-layer configuration, the electrically-conductive layer 204 is comprised of a matrix resin containing electrically-conductive particles. Extending across and directly contacting the electrically-conductive layer 204 are a pair of prepreg layers 212, 214 symmetrically disposed on its opposing major surfaces.

Advantageously, the composite ribbon 200 has a configuration that is thin while providing significant tensile strength, making it suitable for use in automated fiber placement (AFP) and automated tape layup (ATL) manufacturing equipment. Here, tensile strength of the composite ribbon 200 is attributable, to a large degree, by the plurality of fibers embedded in the prepreg layers 212, 214.

Optionally, one or more additional carrier layers may be incorporated into the ribbon 200 to further enhance tensile strength along the length of the ribbon. Examples of useful carrier layers are described in co-pending International Application Publication No. WO2018/063970 (Hebert).

Variants are also possible. Instead of using the prepreg layers 212, 214 in this instance, either or both layers could be replaced with a different insulating layer such as a glass or nylon layer, or even an electrically-conductive layer such as copper foil.

Alternatively, or in combination, the electrically-conductive layer 204 could include a metallic conductive layer, such as an expanded metal mesh. Electrical conductors with down-web oriented strands are described for this purpose in International Application Publication No. WO2017/091365 (Hebert et al.).

Figure 3:
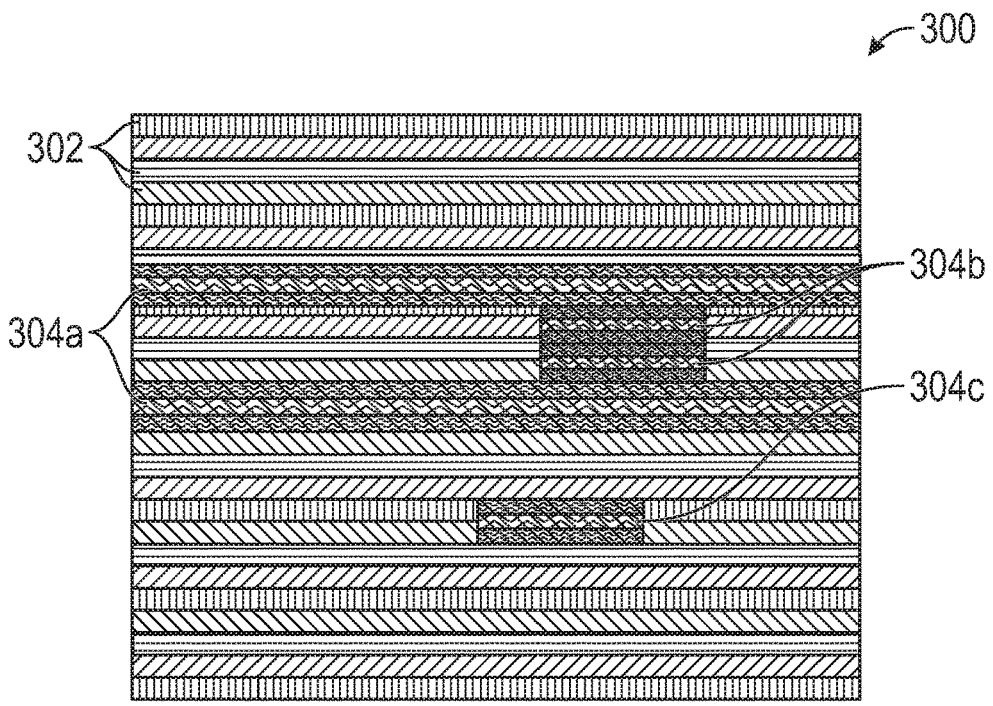
FIG. 3 is a side, cross-sectional view of a composite laminate according to another embodiment incorporating the composite ribbon of FIG. 2.

FIG. 3 shows in cross-section a conductive fiber-reinforced composite laminate 300 that could be prepared from the composite ribbon 200 of FIG. 1. The composite laminate 300 includes a plurality of prepreg layers 302. Embedded within the plurality of prepreg layers 302 are a plurality of electrically-conductive ribbons 304a, 304b. The electrically-conductive ribbons 304a are oriented in one direction (in FIG. 3, parallel to the plane of the page) while the electrically-conductive ribbons 304b, 304c are oriented perpendicular to that direction (in FIG. 3, perpendicular to the plane of the page).

The electrically-conductive ribbons 304a, 304b are stacked in a manner that enables electrical contact from one layer to another. More particularly, the ribbons 304a stand in electrical contact with each other because of a conductive pathway passing through the ribbons 304b, which act as vias between the ribbons 304a. By contrast, the ribbon 304c electrically isolated from the remaining ribbons 304a, 304b because of the surrounding prepreg layers 302, which are electrically-insulating.

Figure 4:
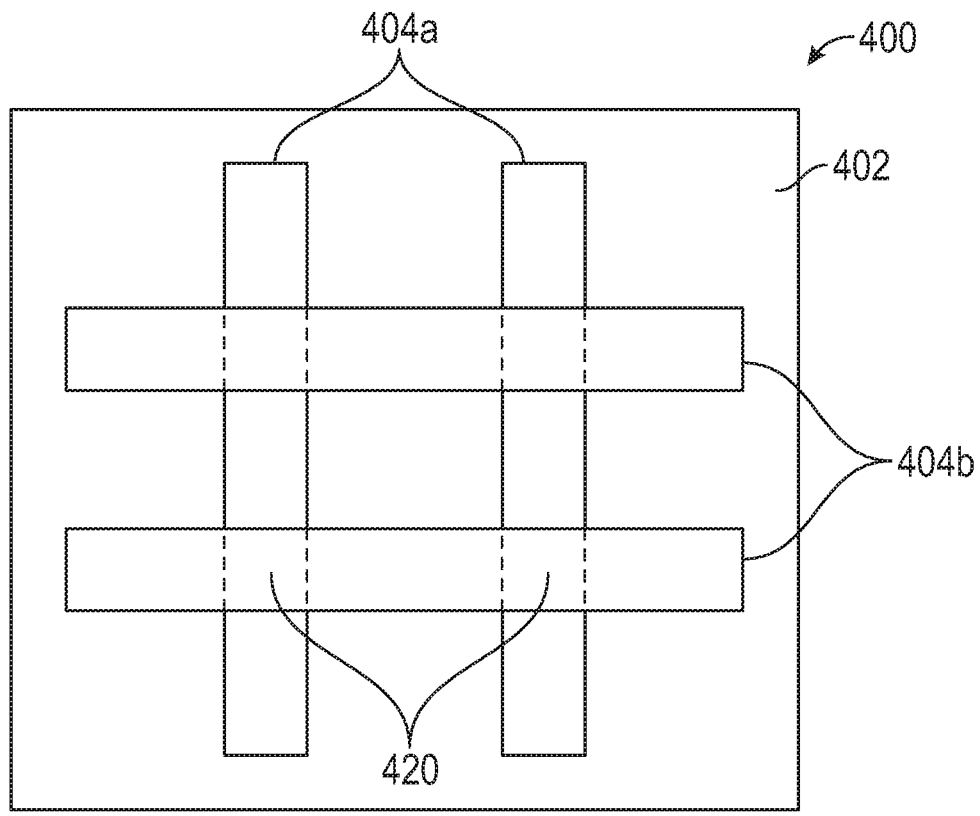
FIG. 4 is plan view of a composite laminate according to still another embodiment.

FIG. 4 shows a composite laminate 400 as viewed from a direction perpendicular to its major surface. The laminate 400 includes a prepreg layer 402, and crisscrossing conductive bands disposed thereon provided by electrically-conductive ribbons 404a, 404b. The ribbons 404a, 404b cross each other at intersections 420.

In this embodiment, the major surfaces of the ribbons 404a, 404b are lined with insulating layers as described in FIG. 2. As a result, the ribbons 404a, 404b each have excellent electrical conductivity along their length but are not in electrical contact at the intersections 420 because the insulating layers separate the overlapping conductive ribbons from each other.

Useful methods for making the provided electrically-conductive composite laminates may be manual, automated, or a combination thereof.

In a hand layup method, individual prepreg and electrically-conductive layers, or combinations thereof, can be assembled from their constituent individual layers. In one embodiment, layers of polymeric resin are first coated from a solution onto a release liner and then dried to provide a solidified resin layer. The resin layer can then be incorporated into a stack along with any other fibrous and/or conductive metal layers, followed by vacuum lamination to consolidate the layers. Lamination can be facilitated using a vacuum table, which may be flat or have curved contours. The consolidated layers can then be cured into a finished composite laminate by autoclaving in a vacuum bag.

AFP and ATL machines can be configured to lay down composite layers onto a substrate according to a pre-determined pattern. The substrate may be a manufacturing tool which can have either a flat or curved surface. The pre-determined pattern can be represented by digital data customized according to the user application. Based on the digital data, the AFP or ATL machine can use a computer programmed to control movement of an automated fiber placement head to fabricate, layer-by-layer, a fiber-reinforced composite laminate.

To fabricate layers that extend across significant areas, the automated fiber placement head can lay down material in a series of successive parallel and contiguous bands. The layered structure of the composite makes it possible for electrically-conductive layers to overlap one another and even cross each other along directions non-parallel relative to each other, enabling three-dimensional electrical circuits. Applications for such electrical circuits include power distribution and storage, data bus, antennae, sensors, and health monitoring networks. Conductors having a configuration distributed across the skin of an aircraft can be useful in lightning strike protection.

In an exemplary method, an automated fiber placement head is moved over a substrate while laying down a first layer, which may be either a prepreg layer or electrically-conductive layer, onto the substrate. The fiber placement head is then used to lay down a second layer, which may be a prepreg layer or electrically-conductive layer, onto the substrate and/or the first layer. This process can continue for any number of layers. For greater coverage, an electrically-conductive layer can include a plurality of electrically-conductive layers that are laid down to overlap each other as viewed from a direction perpendicular to a major surface of the composite.

Multiple layers can be laid down adjacent one another within a single layer or stacked on top of one another. For electrically-conductive layers, this can be an effective way to increase the cross-section of the conductor, thereby increasing its capacity to carry an electric current.

Machine-dispensable prepreg ribbons can have any suitable width to accommodate continuous dispensers. AFP machines typically dispense ribbons having widths in the range of from 3.2 millimeters (0.125 inches) to 38 millimeters (1.5 inches), with even greater widths possible. The narrow dispensing widths of AFP machines make them suitable for depositing prepreg layers onto surfaces with compound curvatures while avoiding wrinkles.

ATL machines can increase throughput by dispensing ribbons having significantly greater widths. While these machines tend to be limited to planar surfaces, they can lay down ribbons at nominal widths of 7.6 centimeters (3 inches), 15 centimeters (6 inches), 30.5 centimeters (12 inches) and more. Overall, the average width of the ribbon can be from 0.01 millimeters to 610 millimeters, from 0.1 millimeters to 310 millimeters, from 3 millimeters to 60 millimeters, or in some embodiments, less than, equal to, or greater than 0.01 millimeters, 0.05, 0.1, 0.5, or 1, 2, 5, 7, 10, 15, 20, 25, 30, 35, 40, 45, 50, 60, 70, 80, 90, 100, 150, 200, 250, 300, 350, 400, 450, 500, 550, 600, or 610 millimeters.

While not intended to be exhaustive, further embodiments of the provided composite articles and related methods are provided as follows:

1. A structural fiber-reinforced composite comprising: a plurality of prepreg layers, each comprising a polymeric resin and a plurality of fibers disposed therein; and at least one electrically-conductive layer in contact with the plurality of prepreg layers, the at least one electrically-conductive layer having a ribbon shape.

2. The composite of embodiment 1, wherein the polymeric resin comprises a thermoset resin.

3. The composite of embodiment 2, wherein the thermoset resin comprises an epoxy, phenolic, bismaleimide, or cyanate ester.

4. The composite of embodiment 1, wherein the polymeric resin comprises a thermoplastic resin.

5. The composite of embodiment 4, wherein the thermoplastic resin comprises a polyurethane, polyvinylidene fluoride, terpolymer of tetrafluoroethylene, hexafluoropropylene and vinylidene fluoride (THV), terpolymer of hexafluoropropylene, tetrafluoroethylene and ethylene (HTE), polyetherimide, polyetheretherketone (PEEK), polyetherketoneketone (PEKK), or combination thereof.

6. The composite of any one of embodiments 1-5, wherein the plurality of fibers comprise a plurality of carbon fibers.

7. The composite of any one of embodiments 1-6, wherein at least one electrically-conductive layer comprises electrically-conductive particles dispersed in a matrix resin.

8. The composite of any one of embodiments 1-7, wherein the electrically-conductive layer comprises electrically-conductive sheets of carbon, metallized glass and/or metallized nylon.

9. The composite of embodiment 7 or 8, wherein the matrix resin comprises an epoxy, phenolic, bismaleimide, cyanate ester, polyurethane, polyvinylidene fluoride, terpolymer of tetrafluoroethylene, hexafluoropropylene and vinylidene fluoride (THV), terpolymer of hexafluoropropylene, tetrafluoroethylene and ethylene (HTE), polyetherimide, polyetherether-ketone (PEEK), polyetherketoneketone (PEKK), or a combination thereof.

10. The composite of any one of embodiments 7-9, wherein the electrically-conductive particles are present in an amount of from 3% to 50% by weight, relative to the overall weight of the electrically-conductive layer.

11. The composite of embodiment 10, wherein the electrically-conductive particles are present in an amount of from 5% to 35% by weight, relative to the overall weight of the electrically-conductive layer.

12. The composite of embodiment 11, wherein the electrically-conductive particles are present in an amount of from 5% to 15% by weight, relative to the overall weight of the electrically-conductive layer.

13. The composite of any one of embodiments 1-12, wherein at least one electrically-conductive layer comprises a metal layer.

14. The composite of embodiment 13, wherein at least one metal layer comprises non-perforated metal foil.

15. The composite of embodiment 13, wherein at least one metal layer comprises a perforated metal layer.

16. The composite of embodiment 15, wherein the perforated metal layer comprises foraminous metal foil.

17. The composite of any one of embodiments 13-16, wherein the metal layer comprises copper, aluminum, titanium, silver, gold, tin, nickel or alloy thereof.

18. The composite of any one of embodiments 13-17, wherein the metal layer has an areal density of from 0.02 gsm to 1000 gsm.

19. The composite of embodiment 18, wherein the metal layer has an areal density of from 4 gsm to 500 gsm.

20 The composite of embodiment 19, wherein the metal layer has an areal density of from 4 gsm to 350 gsm.

21. The composite of any one of embodiments 1-20, wherein at least some of the plurality of prepreg layers are electrically-insulating.

22. The composite of embodiment 21, wherein the electrically-insulating prepreg layers further comprise one or more sheets of glass and/or nylon disposed in the polymeric resin.

23. The composite of any one of embodiments 1-22, wherein the at least one electrically-conductive layer comprises a plurality of electrically-conductive layers that overlap each other as viewed from a direction perpendicular to a major surface of the composite.

24. The composite of embodiment 23, wherein the overlapping electrically-conductive layers directly contact each other.

25. The composite of embodiment 24, wherein the overlapping electrically-conductive layers extend along directions that are non-parallel relative to each other.

26. The composite of any one of embodiments 23-25, wherein at least one prepreg layer has an opening that allows communication between opposing sides of the at least one prepreg layer.

27. The composite of embodiment 26, wherein the plurality of electrically-conductive layers are located on opposite sides of the at least one prepreg layer and contact each other along the opening.

28. The composite of any one of embodiments 1-27, wherein at least one electrically-conductive layer is coplanar with a prepreg layer and provides an electrically-conductive via through the prepreg layer.

29. The composite of any one of embodiments 1-28, wherein at least one electrically-conductive layer has an average thickness of from 4 micrometers to 3000 micrometers.

30. The composite of embodiment 29, wherein at least one electrically-conductive layer has an average thickness of from 8 micrometers to 3000 micrometers.

31. The composite of embodiment 30, wherein at least one electrically-conductive layer has an average thickness of from 12 micrometers to 400 micrometers.

32. The composite of any one of embodiments 1-31, wherein at least one prepreg layer has an average thickness of from 50 micrometers to 900 micrometers.

33. The composite of embodiment 32, wherein at least one prepreg layer has an average thickness of from 100 micrometers to 700 micrometers.

34. The composite of embodiment 33, wherein at least one prepreg layer has an average thickness of from 150 micrometers to 400 micrometers.

35. The composite of any one of embodiments 1-34, wherein at least one electrically-conductive layer comprises a plurality of contiguous electrically-conductive layers arranged in a parallel configuration relative to each other.

36. The composite of any one of embodiments 1-35, wherein each ribbon has an average width of from 0.01 millimeters to 610 millimeters as viewed from a direction perpendicular to a major surface of the composite.

37. The composite of embodiment 36, wherein each ribbon has an average width of from 0.1 millimeters to 310 millimeters as viewed from a direction perpendicular to a major surface of the composite.

38. The composite of embodiment 37, wherein each ribbon has an average width of from 3 millimeters to 60 millimeters as viewed from a direction perpendicular to a major surface of the composite.

39. An aircraft structure comprising the composite of any one of embodiments 1-38.

40. An aircraft skin that is the aircraft structure of embodiment 39.

41. The aircraft skin of embodiment 40, wherein the at least one electrically-conductive layer has a configuration for lightning strike protection.

42. The aircraft skin of embodiment 41, wherein the at least one electrically-conductive layer has a configuration for use in a power distribution, data bus, antenna, sensor, or health monitoring network.

43. A capacitor comprising the composite of any one of embodiments 1-38, wherein the at least one electrically-conductive layer has a configuration for storing electrical energy.

44. A method for providing an electrical conductor in a fiber-reinforced composite comprising: moving an automated fiber placement head over a substrate; using the fiber placement head to lay down a prepreg layer extending over the substrate, the prepreg layer comprising a polymeric resin and a plurality of fibers disposed therein; and using the fiber placement head to lay down an electrically-conductive layer extending over the substrate, wherein the electrically-conductive layer contacts either the substrate or the prepreg layer and the prepreg layer contacts either the substrate or the electrically-conductive layer.

45. The method of embodiment 44, wherein the prepreg layer is a first prepreg layer, and further comprising using the fiber placement head to lay down a second prepreg layer on the electrically-conductive layer, whereby the electrically-conductive layer is embedded between the first and second prepreg layers.

46. The method of embodiment 44 or 45, wherein the electrically-conductive layer is a first electrically-conductive layer, and further comprising using the fiber placement head to lay down a second electrically-conductive layer on the first electrically-conductive layer, the prepreg layer, or both.

47. The method of embodiment 46, wherein the prepreg layer and the electrically-conductive layer are coplanar and do not overlap each other as viewed from a direction perpendicular to a major surface of the substrate.

48. The method of embodiment 47, wherein the electrically-conductive layer has a peripheral edge contacting a peripheral edge of the prepreg layer.

49. The method of embodiment 48, wherein the electrically-conductive layer is a continuous layer and the prepreg layer is a discontinuous layer.

50. The method of embodiment 48, wherein the electrically-conductive layer is a discontinuous layer and the prepreg layer is a continuous layer.

51. The method of embodiment 50, wherein the electrically-conductive layer is a first electrically-conductive layer, and further comprising using the fiber placement head to lay down second and third electrically-conductive layers on opposite sides of the prepreg layer, the first electrically-conductive layer providing a via between the second and third electrically-conductive layers.

52. The method of embodiment 51, wherein the prepreg layer is laid down over certain portions of the substrate but not others, thereby providing one or more openings in the prepreg layer.

53. The method of embodiment 52, wherein the electrically-conductive layer extends over at least a portion of the one or more openings.

54. The method of embodiment 53, wherein the electrically-conductive layer is a first electrically-conductive layer and further comprising using the fiber placement head to lay down a second electrically-conductive layer extending over the prepreg layer opposite the first electrically-conductive layer whereby the first and second electrically-conductive layers contact each other through the one or more openings.

55. The method of any one of embodiments 44-54, wherein the substrate comprises a manufacturing tool.

56. The method of any one of embodiments 44-55, wherein the composite is part of an aircraft.

57. The method of embodiment 56, wherein the composite is part of an aircraft skin.

58. The method of embodiment 57, wherein the electrically-conductive layer has a configuration to provide lightning strike protection.

59. The method of any one of embodiments 44-55, wherein the composite is part of a capacitor and wherein the electrically-conductive layer has a configuration for storing electrical energy.

EXAMPLES

Objects and advantages of this disclosure are further illustrated by the following non-limiting examples, but the materials and amounts thereof recited in these examples, as well as other conditions and details, should not be construed to unduly limit this disclosure.

Unless otherwise noted, all parts, percentages, ratios, etc. in the Examples and the rest of the specification are by weight.

TABLE 1

Materials

| Designation | Description | Source |
| --- | --- | --- |
| 7781 | Glass fiber prepreg fabric available under the trade designation "HEXFORCE 7781" | Hexcel, Seguin, TX. United States |
| 970/PWC | Carbon fiber prepreg available under the designation "970/PWC FT300 3K UT" | Cytec, Woodland Park, NJ. United States |
| CG-1400 | Dicyandiamide, available under the trade designation "AMICURE CG-1400" | Air Products and Chemicals, Midland, MI. United States |
| DF-1 | A polymeric, non-silicone, flow additive, available under the trade designation "DYNOADD F-1" | Dynea Oy, Helsinki, Finland |
| DER-330 | A low viscosity liquid epoxy resin is a reaction product of epichlorohydrin and bisphenol-A, obtained under the trade designation "D.E.R. 330" | Dow Chemical Company, Midland, MI. United States |
| DER-6508 | An isocyanate-modified 2-functional epoxy resin, obtained under the trade designation "D.E.R. 6508" | Dow Chemical Company, Midland, MI. United States |
| ECF | 57-175 gsm expanded copper foil, obtained under the trade designation "AEROMESH" | Benmetal GmbH, Seigen, Germany |
| EPON SU-8 | An epoxy novolac resin having an average epoxide group functionality of approximately eight, available under the trade designation "EPON SU-8" | Hexion Inc, Columbus, OH. United States |
| MEK | Methyl ethyl ketone | VWR International, Randor, PA. United States |
| MPK | Methyl propyl ketone | VWR International, Randor, PA. United States |

TABLE 1-continued

Materials

| Designation | Description | Source |
|---|---|---|
| MX-257 | A 37% concentrate of core shell rubber toughening agent in liquid epoxy resin based on Bisphenol-A, obtained under the trade designation "MX-257" | Kaneka North America, LLC, Pasadena, TX. United States |
| MY-9634 | A tetrafunctional epoxy resin, available under the trade designation "ARALDITE MY-9634" | Huntsman Corporation, Woodland, TX. United States |
| P2353U | A unidirectional epoxy prepreg, available under the trade designation "TORAY P2353U 19 152" | Toray Industries, Inc, Tokyo, Japan |
| PCD1 | 35:60:5 parts by weight polycarbodiimide:MEK:cyclohexanone | 3M Company, St. Paul, MN. United States |
| PG-7 | A copper-phthaocyanine pigment, available under the trade designation "VYNAMON GREEN 600734" | Heucotech Ltd., Fairless Hills, PA. United States |
| RA-95 | A bisphenol-A epoxy resin modified carboxyl terminated butadiene acrylonitrile elastomer, available under the trade designation "HYPOX RA-95" | CVC Specialty Chemicals Incorporated, Moorestown, PA. United States |
| R-960 | A rutile titanium dioxide pigment, available under the trade designation "TI-PURE R-960" | E.I. du Pont de Nemours and Company, Wilmington, DE. United States |
| SD-3 | A modified hectorite clay, available under the trade designation "BENTONE SD-3" | Elementis Specialties, Hightown, NJ. United States |
| TS-720 | A treated fumed silica, available under the trade designation "CAB-O-SIL TS-720" | Cabot Corporation, Billerica, MA. United States |
| U-52 | An aromatic substituted urea (4,4' Methylene bis (phenyl dimethyl urea), available under the trade designation "OMICURE U-52" | CVC Specialty Chemicals Incorporated, Moorestown, PA. United States |
| CP18 | Silver-coated copper granular particles, 18 weight % of silver content available under the designation "CONDUCT-O-FIL ®" SC400P18 | Potters Industries Inc part of PQ Corporation, Valley Forge, PA. United States |
| F20 | Silver-coated glass fibers, 20 weight % of silver content available under the designation "CONDUCT-O-FIL ®" SG180FB20 | Potters Industries Inc part of PQ Corporation, Valley Forge, PA. United States |
| GF35 | Silver-coated glass flakes, 35 weight % of silver content available under the designation "CONDUCT-O-FIL ®" SG15F35 | Potters Industries Inc part of PQ Corporation, Valley Forge, PA. United States |
| MS33 | Silver-coated hollow glass spheres flakes, 33 weight % of silver content available under the designation "CONDUCT-O-FIL ®" SH230S33 | Potters Industries Inc part of PQ Corporation, Valley Forge, PA. United States |

Examples 1-15 (EX1-EX15)

Step 1: Mill Base Preparation

At a temperature of 21.1° C. (70° F.), 14.32 grams DER-330, 0.77 grams SD-3, 0.47 grams PG-7, 2.33 grams R-960, 4.40 grams CG-1400 and 0.23 grams U-52 were charged into a plastic cup designed for use in a planetary mill, model "SPEED MIXER DA 400 FV", available from Synergy Devices Limited, Buckinghamshire, United Kingdom. The cup was placed into a planetary mixer and mixed at 2200 rpm for two minutes. The mixture was milled in a three-roll mill for three passes and then set aside.

At a temperature of 21.1° C. (70° F.), 21.46 grams DER-6508 and 8.41 grams EPON SU-8 were manually crushed with a pestle and mortar and charged into another plastic cup designed for use in the planetary mill. 13.29 grams MEK and 2.71 grams MPK were added to the cup, which was then secured to the mill and rotated at 2,200 rpm until the mixture was dissolved (approximately fifteen minutes).

Step 2: Adhesive Composition (AC)

12.99 grams MX-257, 3.05 grams MY-9634, 0.67 grams DF-1, 4.328 grams RA-95, 1.48 grams TS-720, 16.06 grams of the mill base, and 5.7 grams PCDI were added to the cup. The mixture was returned to the planetary mixer and mixing continued for another one minute at 2,000 rpm. The mixture was manually scraped and returned to the planetary mill until all components were homogeneously dispersed (approximately one minute).

Step 3: Resin Composition

Quantities of conductive particles, MEK, and the adhesive composition (AC) were combined in a cup as represented in Table 2 and mixed in the planetary mixer for one minute at 2000 rpm. The sides of the cup were manually scraped, and the mixture was returned to the planetary mixer until all components were homogeneously dispersed (approximately one minute).

TABLE 2

| Resin Compositions (in grams) | | | | | | |
|---|---|---|---|---|---|---|
| | AC | MEK | GF35 | CP18 | F20 | MS33 |
| EX1 | 20.0 | 5.4 | 18.6 | 0.0 | 0.0 | 0.0 |
| EX2 | 20.0 | 5.4 | 0.0 | 18.6 | 0.0 | 0.0 |
| EX3 | 20.0 | 5.4 | 0.0 | 0.0 | 18.6 | 0.0 |
| EX4 | 20.0 | 5.4 | 0.0 | 0.0 | 0.0 | 18.6 |
| EX5 | 10.0 | 2.09 | 5.0 | 0.0 | 0.0 | 0.0 |
| EX6 | 10.0 | 2.09 | 0.0 | 5.0 | 0.0 | 0.0 |
| EX7 | 10.0 | 2.09 | 0.0 | 0.0 | 5.0 | 0.0 |
| EX8 | 10.0 | 2.09 | 0.0 | 0.0 | 0.0 | 5.0 |
| EX9 | 10.0 | 1.56 | 1.24 | 0.0 | 0.0 | 0.0 |
| EX10 | 10.0 | 1.56 | 0.0 | 1.24 | 0.0 | 0.0 |
| EX11 | 10.0 | 1.56 | 0.0 | 0.0 | 1.24 | 0.0 |
| EX12 | 10.0 | 1.56 | 0.0 | 0.0 | 0.0 | 1.24 |
| EX13 | 20.0 | 2.93 | 1.05 | 0.0 | 0.0 | 0.0 |
| EX14 | 20.0 | 2.93 | 0.0 | 0.0 | 1.05 | 0.0 |
| EX15 | 20.0 | 2.93 | 0.0 | 0.0 | 0.0 | 1.05 |

Step 4: Conductive Ribbon Assembly

The resin compositions represented in Table 2 were subsequently notch bar coated, at approximately 20.3 cm×20.3 cm (8 inch by 8 inch), onto a bleached silicone coated release liner, type "23210 76 #BL KFT H/HP 4D/6 MH", obtained from Loparex, Inc., Iowa City, IA. United States, at bar gaps of 101.6 micrometers (4 mil). The resin compositions were dried for at least twelve hours at approximately 21.1° C. (70° F.). A sheet of 73 gsm ECF was laid between two sheets of the dried resin coating. This assembly was then placed in a layup tool and a vacuum of 84.7 kPa (12.3 psi) applied for approximately five to ten minutes. The consolidated conductors were then slit into 6.35 mm (¼ inch) ribbons.

Step 5: Panel Construction

Four sheets approximately 25.4 cm×25.4 cm (10 inch by 10 inch) of P2353U prepreg were laid on a vacuum table, orientated at 0/90/90/0 degrees, and a vacuum of 84.7 kPa (12.3 psi) was applied for approximately five to ten minutes to secure the sheets. Strips of the 6.35 mm (¼ inch)

electrically-conductive ribbons (505a, 505b) were applied to the prepreg to form a finished panel layup represented in FIG. 4. The finished panel layup was placed in an autoclave and a vacuum of approximately 94.8 kPa (13.7 psi) was applied to the inside of the bag for ten to fifteen minutes at 22.2° C. (72° F.). External pressure was gradually increased to 397 kPa (57.5 psi). The vacuum inside the bag was maintained at 94.8 kPa (13.7 psi) and the temperature was increased at a rate of 2.8° C. (5° F.) per minute until reaching 176.7° C. (350° F.). This temperature was held for two hours and then the temperature was returned to 22.2° C. (72° F.). The pressure was released, and the cured composite article was removed from the vacuum bag.

Step 6: Conductivity Testing

Figure 5:
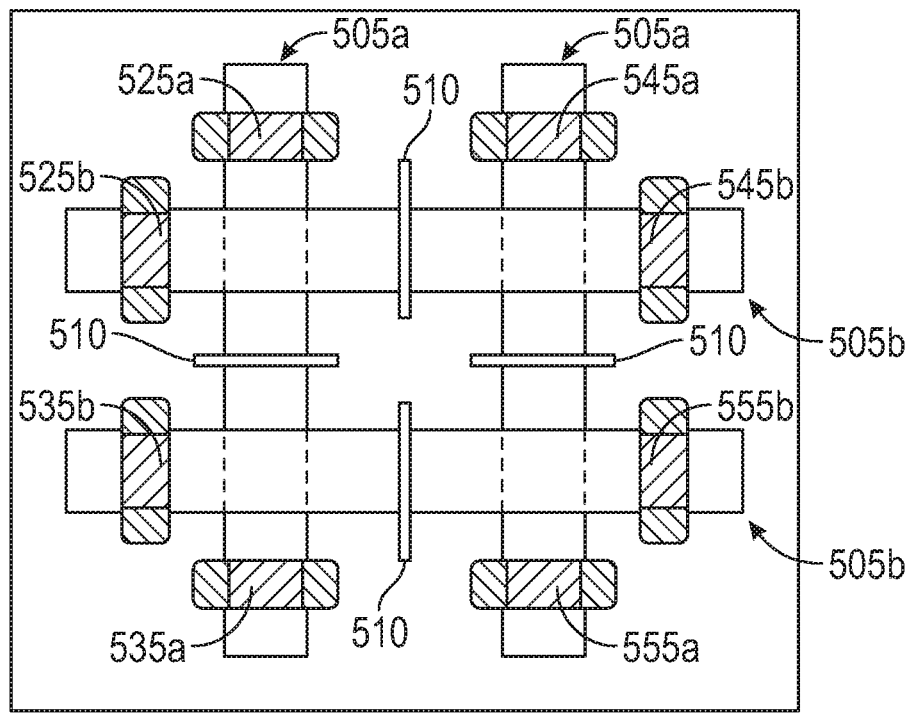
FIG. 5 is plan view of the composite laminate of FIG. 4 in a test configuration.

After curing, a Model 3636 CNC router obtained from Shopsaber of Lakeville, MN. United States was used to sever the electrically-conductive ribbons 505a, 505b in four locations represented in FIG. 5 as 510. A hand grinder was used to expose the electrically-conductive ribbons at eight locations 525a, 535a, 545a, 545a, 525b, 535b, 545b, and 555b as represented in FIG. 5. Resistance was measured with a Fluke multimeter across pairs (525a-to-525b, 535a-to-535b, 545a-to-545b, and 555a-to-555b) of exposed conductors and the results were recorded (as an average of three measurements) in Table 3. The resistance between exposed ends of unconnected ribbons was beyond measurable.

TABLE 3

Joint Resistance Measurement Results

| Example | Resistance (Ohms) |
|---|---|
| EX1 | 0.20 |
| EX2 | 0.20 |
| EX3 | 0.20 |
| EX4 | 0.20 |
| EX5 | 0.17 |
| EX6 | 0.18 |
| EX7 | 0.17 |
| EX8 | 0.18 |
| EX9 | 0.17 |
| EX10 | 0.16 |
| EX11 | 0.15 |
| EX12 | 0.16 |
| EX13 | 0.17 |
| EX14 | 0.15 |
| EX15 | 0.19 |

Preparatory Example 1

Figure 6:
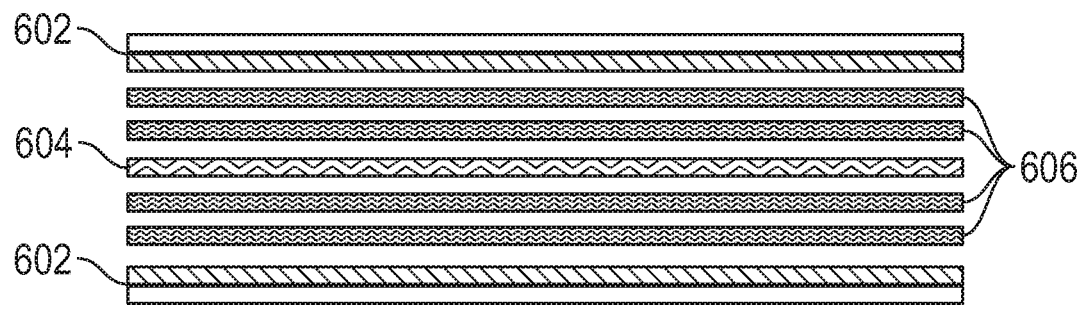
FIGS. 6 and 7 are exploded views showing the layers of composite laminates according to two different embodiments.

Adhesive composition (AC) was knife coated onto a paper liner using a 51 micrometer (2 mil) gap. The adhesive composition dried into a film for twelve hours at room temperature. Two sheets of the film 602, four sheets of 4 gsm Cu—Ni—Carbon fiber paper 606 obtained from Technical Fibers of Schenectady, NY. United States, and a 73 gsm ECF expanded copper foil 604 were arranged as represented in FIG. 6. The layers were vacuum laminated together at room temperature and 84.7 kPa (12.3 psi) for one hour to produce a construct as illustrated in FIG. 2. The construct was then slit into 6.35 mm (¼ inch) wide strips assembling conductive ribbons with z-axis conductivity.

Preparatory Example 2

Figure 7:
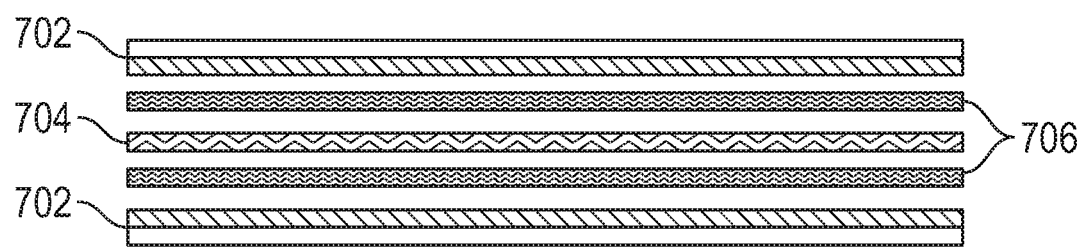

Adhesive composition (AC) was knife coated onto a paper liner using a 51 micrometer (2 mil) gap. The adhesive composition dried into a film for twelve hours at room temperature. Two sheets of the film 702, two sheets of 10 gsm glass fiber paper 706 obtained from Technical Fibers of Schenectady, NY. United States, and a 73 gsm ECF expanded copper foil 704 were arranged as represented in FIG. 7. The layers were vacuum laminated together at room temperature and 84.7 kPa (12.3 psi) for one hour to produce a construct as illustrated in FIG. 2. The construct was then slit into 6.35 mm (¼ inch) wide strips assembling conductive ribbons without z-axis conductivity.

Example 16 (EX16)

Figure 8:
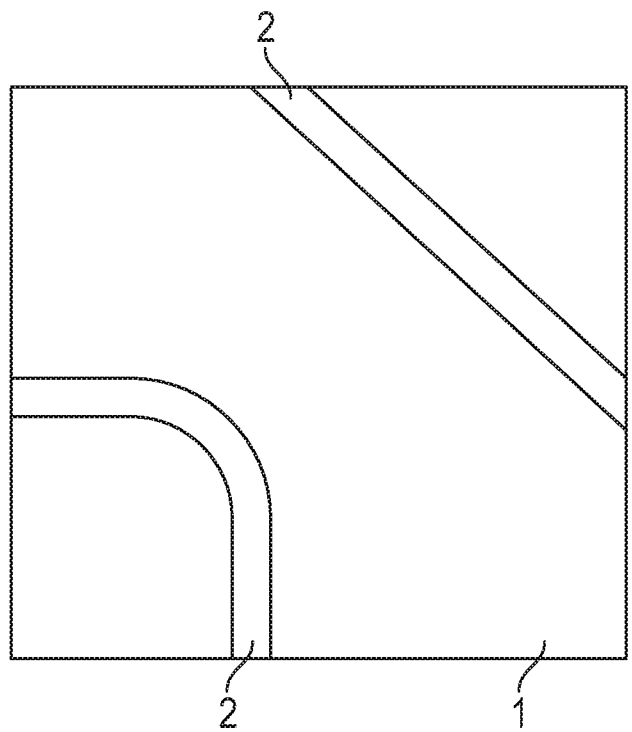
FIGS. 8-12 are plan views showing a sequence of steps used to make a composite laminate in an exemplary embodiment.

Two sheets of approximately 20.32 cm×20.32 cm (8-inch×8 inch) 7781 glass fabric prepreg were placed on a vacuum table, orientated at 0/90 degrees, and a vacuum of 84.7 kPa (12.3 psi) was applied for approximately five to ten minutes to secure the sheets as Sequence 1 illustrated in FIG. 8. Two ribbons prepared in Preparatory Example 2 were placed on the consolidated prepreg, one straight and one curved (represented as Sequence 2 in FIG. 8). A vacuum of 84.7 kPa (12.3 psi) was applied for approximately five to ten minutes to secure the ribbons.

Figure 9:
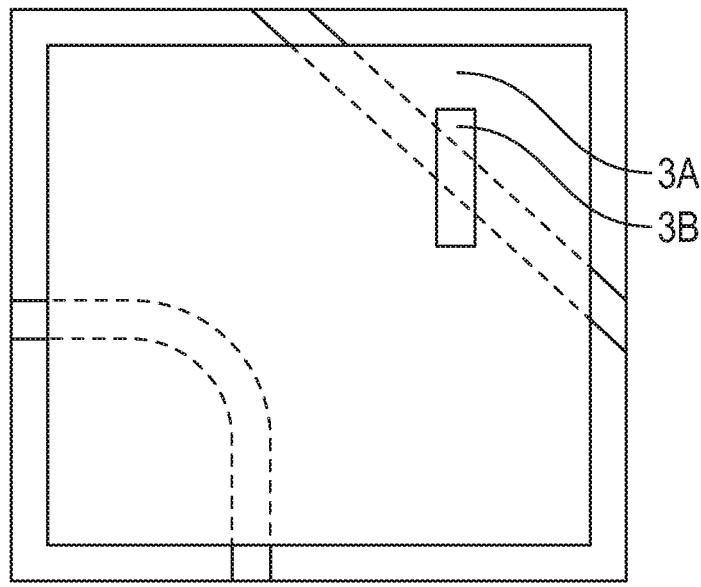
Figure 10:
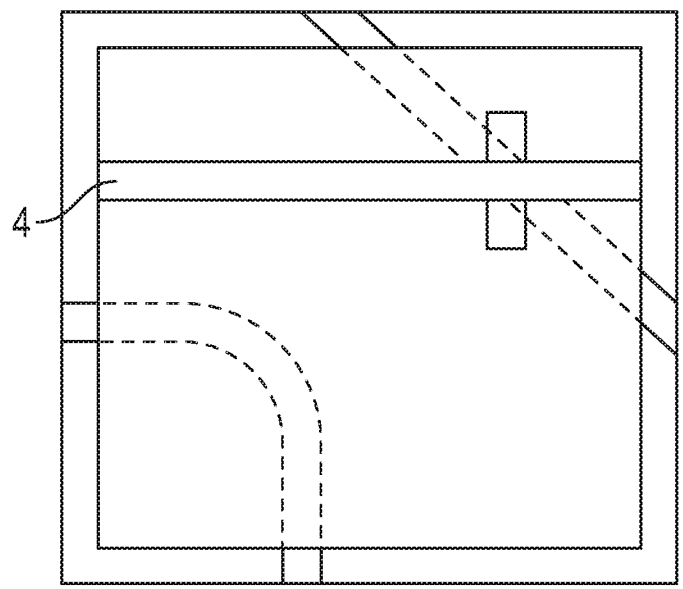

A rectangular slot 6.35 mm (¼ inch) by 50.8 mm (2 inch) was trimmed into two sheets of approximately 16.51 cm×16.51 cm (6.5 by 6.5 inch) 7781 glass fabric prepreg that were positioned over the straight ribbon created in Sequence 2. This process is represented as Sequence 3A in FIG. 9 (Note: dashed lines in FIGS. 9-12 indicate ribbon shape and positioning underneath subsequently stacked layers). A 5.08 cm (2 inch) long ribbon assembled in Preparatory Example 2 was positioned to fill the rectangular opening cut into each prepreg sheet to form Sequence 3B illustrated in FIG. 9. The glass fabric prepreg was laid on the consolidated prepreg, orientated at 0/90 degrees with the ribbon in place and a vacuum of 84.7 kPa (12.3 psi) was applied for approximately five to ten minutes to secure the sequence.

Sequence 4 (represented in FIG. 10) positioned a ribbon prepared in Preparatory Example 2 onto the consolidated prepreg such that it intersected the segment of the ribbon prepared in Preparatory Example 2 in Sequence 3 (refer to FIG. 9) without intersecting the projection of the curved ribbon of Sequence 2. A vacuum of 84.7 kPa (12.3 psi) was applied for approximately five to ten minutes to secure the ribbon.

Figure 11:
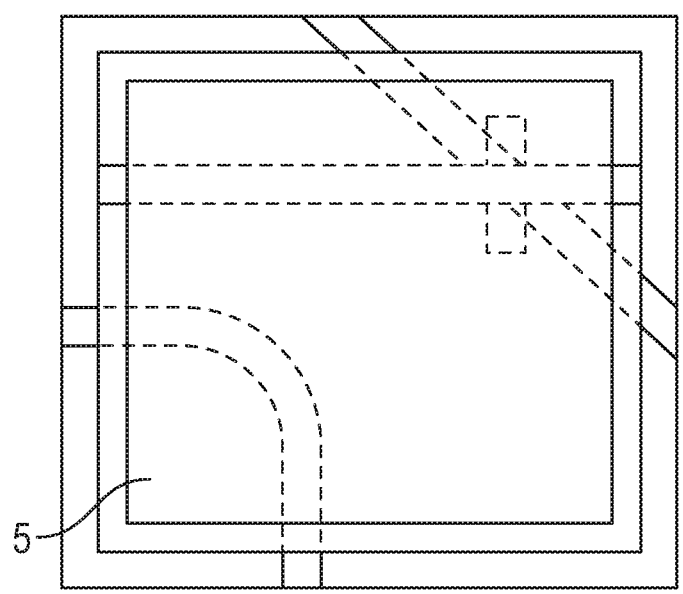

Two sheets of approximately 12.7 cm×12.7 cm (5-inch×5 inch) 7781 glass fabric prepreg were then placed on the consolidated prepreg, orientated at 0/90 degrees and a vacuum of 84.7 kPa (12.3 psi) was applied for approximately five to ten minutes to secure the sheets as Sequence 5 illustrated in FIG. 11.

The finished panel was placed in an autoclave and a vacuum of 94.8 kPa (13.7 psi) was applied to the inside of the bag for ten to fifteen minutes at 22.2° C. (72° F.). External pressure was gradually increased to 397 kPa (57.5 psi). The vacuum inside the bag was maintained at 94.8 kPa (13.7 psi) and the temperature was increased at a rate of 2.8° C. (5° F.) per minute until reaching 176.7° C. (350° F.). This temperature was held for two hours and then the temperature was returned to 22.2° C. (72° F.). The pressure was released, and the cured composite article was removed from the vacuum bag.

Example 17 (EX17)

A panel was fabricated identically as Example 16 except that the ribbon assembled in Preparatory Example 1 was used in place of the ribbon prepared by Preparatory Example 2.

Example 18 (EX18)

A panel was fabricated identically as Example 16 except that 970/PWC carbon fabric prepreg was used instead of the 7781 glass fabric prepreg.

Example 19 (EX19)

A panel was fabricated identically as Example 16 except that 970/PWC carbon fabric prepreg was used instead of the 7781 glass fabric prepreg and the ribbon assembled in Preparatory Example 1 was used in place of the ribbon prepared by Preparatory Example 2.

Figure 12:
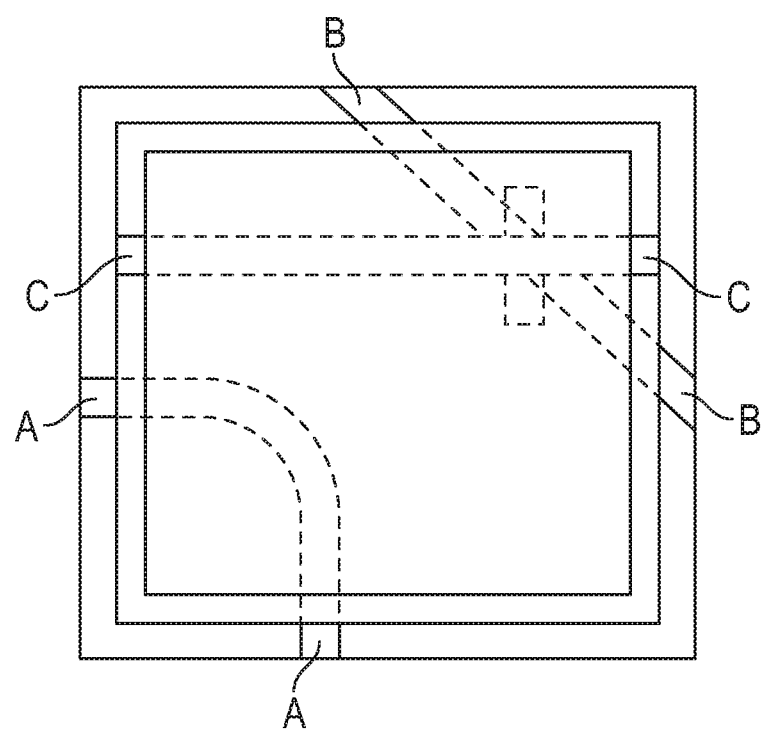

After curing, Examples 16-19 were abraded to expose the conductors at sites A, B, and C as illustrated in FIG. 12. Resistance measurements were taken at sites A-to-A, B-to-B, and C-to-C with a Fluke multimeter to verify conduction along each ribbon. Resistance measurements were recorded A-to-B to determine how the prepreg conducts between non-intersecting ribbons sandwiched between the same prepreg layers. Resistance measurements were recorded A-to-C to determine how the prepreg conducts between non-intersecting ribbons separated by two prepreg layers. Resistance measurements were recorded B-to-C to determine how the prepreg conducts between non-intersecting ribbons connected by a via constructed of ribbons. Resistance measurements were averaged and are reported in Table 4 (N/A represents the condition where resistance was too high and conductivity was too low to obtain a measurement).

TABLE 4

Measurement Resistance

| | Measurement Resistance (Ohms) by Site | | | |
|---|---|---|---|---|
| | A-to-A<br>B-to-B<br>C-to-C | A-to-B | A-to-C | B-to-C |
| EX16 | 0.17 | N/A | N/A | N/A |
| EX17 | 0.18 | N/A | N/A | 0.19 |
| EX18 | 0.17 | 0.41 | 0.53 | 0.52 |
| EX19 | 0.17 | 0.36 | 0.33 | 0.16 |

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given to enable one of ordinary skill in the art to practice the claimed disclosure, is not to be construed as limiting the scope of the disclosure, which is defined by the claims and all equivalents thereto.

What is claimed is:

1. A structural fiber-reinforced composite comprising:
   a plurality of prepreg layers, each comprising a polymeric resin and a plurality of fibers disposed therein; and
   a first electrically-conductive layer in contact with the plurality of prepreg layers, the first electrically-conductive layer having a ribbon shape aligned in a first direction,
   a second electrically-conductive layer in contact with the plurality of prepreg layers, the second electrically-conductive layer having a ribbon shape aligned in a second direction, and
   wherein at least one of the plurality of prepreg layers is an insulating layer,
   wherein the first direction is different from the second direction such that the first and second electrically-conductive layers overlap with each other at intersections when viewed from a direction perpendicular to a major surface of the composite, and
   wherein the insulating layer prevents the first electrically-conductive layer from being in electrical contact with the second electrically-conductive layer at the intersections.

2. The composite of claim 1, wherein the polymeric resin comprises a thermoset resin and wherein the thermoset resin comprises an epoxy, phenolic, bismaleimide, or cyanate ester.

3. The composite of claim 1, wherein the polymeric resin comprises a thermoplastic resin.

4. The composite of claim 3, wherein the thermoplastic resin comprises a polyurethane, polyvinylidene fluoride, terpolymer of tetrafluoroethylene, hexafluoropropylene and vinylidene fluoride (THV), terpolymer of hexafluoropropylene, tetrafluoroethylene and ethylene (HTE), polyetherimide, polyetheretherketone (PEEK), polyetherketoneketone (PEKK), or combination thereof.

5. The composite of claim 1, wherein at least one of the first and second electrically-conductive layers comprises electrically-conductive particles dispersed in a matrix resin.

6. The composite of claim 1, wherein at least one of the first and second electrically-conductive layers comprises electrically-conductive sheets of carbon, metallized glass and/or metallized nylon.

7. The composite of claim 1, wherein at least one of the first and second electrically-conductive layer comprises a metal layer.

8. The composite of claim 1, wherein the at least one electrically-insulating prepreg layers-layer further comprise one or more sheets of glass and/or nylon disposed in the polymeric resin.

9. The composite of claim 1, wherein at least one prepreg layer has an opening that allows communication between opposing sides of the at least one prepreg layer.

10. The composite of claim 9, wherein the plurality of electrically-conductive layers are located on opposite sides of the at least one prepreg layer and contact each other along the opening.

11. The composite of claim 1, wherein the at least one electrically-conductive layer is coplanar with a prepreg layer and provides an electrically-conductive via through the prepreg layer.

* * * * *